United States Patent [19]

Corsello et al.

[11] Patent Number: 4,472,437
[45] Date of Patent: Sep. 18, 1984

[54] DICALCIUM PHOSPHATE AS GUM BASE FILLER

[75] Inventors: Vincent Corsello, Albertson; Allan H. Graff, Hartsdale; Michael Glass, Flushing, all of N.Y.

[73] Assignee: Warner-Lambert Company, Morris Plains, N.J.

[21] Appl. No.: 471,074

[22] Filed: Mar. 1, 1983

[51] Int. Cl.³ .............................................. A23G 3/30
[52] U.S. Cl. .......................................... 426/3; 426/72
[58] Field of Search ....................................... 426/3-6

[56] References Cited

U.S. PATENT DOCUMENTS

| | | | |
|---|---|---|---|
| 3,085,048 | 4/1963 | Bush | 426/3 |
| 3,655,866 | 4/1972 | Bilotti | 426/3 |
| 4,248,894 | 2/1981 | Mackay | 426/3 |
| 4,252,830 | 2/1981 | Kehoe et al. | 426/3 |
| 4,317,837 | 3/1982 | Kehoe et al. | 426/3 |
| 4,357,354 | 11/1982 | Kehoe et al. | 426/3 |

*Primary Examiner*—Jeanette Hunter
*Attorney, Agent, or Firm*—Daniel A. Scola, Jr.; Gary M. Nath

[57] ABSTRACT

A bubble gum composition having improved film forming, flavor release and chew characteristics comprising a gum base, flavor and sweetener, the improvement which comprises having about 4% to about 30% by weight of the gum base dicalcium phosphate anhydrous as a filler for said gum base.

12 Claims, No Drawings

DICALCIUM PHOSPHATE AS GUM BASE FILLER

BACKGROUND OF THE INVENTION

Mineral materials such as calcium carbonate, magnesium silicate and magnesium carbonate, among others, have long been known to be effective additives for chewing gum compositions. Ordinarily, these materials are used as fillers for the chewing gum composition for the purpose of reducing cost, texturizing and softening the rubber in the gum base. Additionally, it is been known to use fillers for the purpose of holding in flavor. U.S. Pat. No. 2,076,112 discloses the use of mineral ingredients such as anhydrous magnesium silicate, commonly known as talc, for the purpose of improving the consistency of the chewing gum as a whole, and helping to hold in the flavor as the chewing gum is masticated.

More recently, dicalcium phosphate has been added to the chewing gum composition as an anticariogenic agent. U.S. Pat. No. 3,011,949, discloses chewing gum compositions containing solid powder fillers such as dicalcium phosphate, for the purpose of supplementing the supply of calcium and phosphate in saliva. This supplement helps to aid against decay-producing acids that are produced and exist in the saliva. The patentee discloses the effectiveness of the dicalcium phosphate to be easily released from the chewing gum during mastication to provide this effect. The dicalcium phosphate is disclosed as an improved source of calcium and phosphate over other possible sources.

U.S. Pat. No. 3,655,866 discloses a releasable form of dicalcium phosphate dihydrate prepared for sugarless gum. The dicalcium phosphate is coated with a water-soluble polyol or mixture of polyols, for example, sorbitol, xylitol, mannitol prior to the incorporation of the mineral material into the gum composition. This patent also discloses and claims a process for incorporation of the dicalcium phosphate dihydrate.

U.S. Pat. No. 4,064,274 teaches that gum bases containing calcium carbonate as a filler produce chewing gums which tend to lose their sweetness retention after a few weeks of storage.

U.S. Pat. No. 3,085,048 teaches an improved process for coating dicalcium phosphate with sugar such that the dicalcium phosphate will be gradually released into the saliva to contribute to an anticariogenic effect. The dicalcium phosphate is added to the gum composition and released slowly when the chewing gum is masticated.

In U.S. Pat. No. 4,238,475, several mineral materials are disclosed as having therapeutic value when included in chewing gums. Magnesium hydroxide, calcium carbonate, dicalcium phosphate and the like, are disclosed in a chewing gum composition which is capable of releasing these finely-divided water insoluble therapeutic materials into the saliva as mastication occurs. This patent concentrates on the extension of sweetening release by the addition of a second sweetener which is released subsequent to the first sweetener. The therapeutic, mineral component is coated with gum arabic to facilitate the release from the chewing gum into the saliva and to prevent the resorption of the mineral component back into the gum base.

Heretofore, there has not been a chewing gum composition which has used dicalcium phosphate in the gum base itself as a means of providing better film forming capability. In particular, none of the references suggest the use of the anhydrous form of dicalcium phosphate in any aspect of a chewing gum composition.

The applicants are aware that calcium carbonate cannot be effectively used in gum bases which contain food acidulents, such as malic or citric acids. This is because of the acid-base reaction that is produced between the mineral material and the acidulent. The result of this reaction is the production of carbon dioxide which inflates the gum package. This is a deleterious effect since the package may burst due to inflation making the product defective and subject to becoming stale. Additionally, the food acidulent is consumed in the acid-base reaction, thereby defeating its intended purpose.

To attempt to overcome the disadvantages of calcium carbonate, the applicant tried to obtain the desired film forming, chew and stability characteristics by substituting magnesium silicate into the gum base of chewing gum compositions which contained acidulents. It was found, however, that film forming properties of the overall chewing gum were not as good as with the calcium carbonate and further that a tough undesirable chew and undesirable flavor release characteristics were produced.

Film forming is particularly important in chewing gum compositions intended to form bubbles.

In chewing gum compositions intended for blowing bubbles, the ease and quality of the bubble are significant considerations and are obviously dependent on the combination of ingredients in the gum base. The gum base filler is known to play a part in the overall film-forming (bubble-producing) capability of the chewing gum composition as a whole. Films which are too thick may be difficult to form and blow into bubbles, whereas films which are very thin may produce a bubble which breaks too easily.

One objective in the present invention is to formulate a gum base which when incorporated into a chewing gum composition, e.g. in a bubble gum composition, allows for large, easily formed bubbles to be blown, while maintaining good flavor impact and release and a delicate chew balance.

It is known that chewing gum compositions containing calcium carbonate as a filler develop a perceptively harder chew after the initial five minutes of mastication. Thus, another object of this invention is to prepare a chewing gum composition which maintains an excellent chew for ten to fifteen minutes or longer.

Another object of this invention is to overcome the stability disadvantages of the prior art acid-containing chewing gums where the filler tended to react with the acid. Toward this end, the instant invention incorporates dicalcium phosphate anhydrous as a filler into the gum base of the composition.

Other objects of this invention will become apparent below and the foregoing are not meant in any way to limit the effective scope of the invention as claimed.

Dicalcium phosphate anhydrous, when incorporated into the gum base of a chewing gum composition, in the amounts specified below, produced excellent film-forming, stability and chew characteristics, in addition to good flavor impact and release.

SUMMARY OF THE INVENTION

The instant invention concerns a novel chewing gum base to be used in a chewing gum composition, having improved film forming capabilities, flavor release and chew characteristics and excellent stability, comprising a natural or synthetic rubber and a dicalcium phosphate anhydrous filler present in the amounts of about 4% to about 30% by weight of the gum base.

Additionally, this invention relates to a stable chewing gum composition which comprises a gum base, a flavor, acidulent and a sweetener, the improvement which comprises having about 4% to about 30% by weight of the gum base of dicalcium phosphate anhydrous filler for said gum base whereby flavor release, film forming capability and chew characteristics are improved.

DETAILED DESCRIPTION OF THE INVENTION AND PREFERRED EMBODIMENTS

The applicants have unexpectedly discovered that significantly improved film-forming capability results when dicalcium phosphate is added as a filler to the gum base of the chewing gum composition. The applicants have also discovered that the filler of the instant invention are particularly useful where the gum base is to be formulated into a chewing gum composition which contains food acidulents. More particularly the dicalcium phosphate anhydrate fillers of the instant invention are extremely useful in gum bases to be used in sour chewing gum compositions, e.g. citrus flavored chewing gums and the like, where acidulents are prevalent.

Both the dihydrate form as well as the anhydrous form of dicalcium phosphate are useful as fillers, the preferred being the anhydrous form. Dicalcium phosphate anhydrate can be used in gum bases for chewing gum compositions in the same amounts as traditional fillers, that is, in the general range of about 4% to about 30% by weight of the gum base. It is preferred, however, that dicalcium phosphate anhydrous be present in the gum base in the range of about 5% to 20% and more preferably in the range of about 5% to about 13% by weight of the gum base.

The applicants have discovered that the anhydrous form of the dicalcium phosphate filler has advantages over the dihydrous form when incorporated into a gum base. The anhydrous form is less temperature sensitive during the gum base manufacturing process than the dihydrate. This is because the dihydrate form tends to lose its moisture at a non-controlled and non-predictable rate during processing of the gum base. This results in unacceptable variability in base processing and in the finished gum processing and chew characteristics. The anhydrous form generally has a larger, harder and coarser particle than the dihydrate, all of which contribute to the chew characteristics of the overall chewing gum composition. Particle size and abrasion generally affect the way in which the filler modifies the texture of the gum base and imparts a particular film forming capability. In the instant invention, it is believed that the particle size, hardness and abrasiveness of the anhydrous form is at least in part responsible for the excellent properties of the instant gum bases and chewing gum compositions. A comparison of physical properties of the anhydrate and dihydrate forms of dicalcium phosphate are indicated below. These values were taken from the manufacturer's product specification sheets (Monsanto Co.).

| | Dicalcium Phosphate Anhydrate | Dicalcium Phosphate Dihydrate |
|---|---|---|
| Loss of moisture on ignition | 6.6–8.5% | 24.5–26.5% |
| MOHS hardness | 3.5 | 2.5 |
| Radioactive Dentin Abrasion (RDA) | 1250 | 350 |
| Mean Particle Diameter (Coulter Counter, Volume Average) | 15–16 micrometers | 9–10 micrometers |
| Particle Size* | | |
| 200 screen | 1.0% maximum | 0.1 maximum |
| 325 screen | 98.0% maximum | 98.1% maximum |

*Indicates % of particles passing through a 200 size and 325 size screen. This confirms the mean particle diameter measurement.

Loss of moisture on ignition is an indication of the extent of water loss during high temperature exposure. As previously mentioned, the dihydrate form loses a significantly higher percentage of water which cannot be controlled or predicted.

Dicalcium phosphate, used as a gum base filler in a food acid-containing chewing gum, for instance, a fruit flavor gum, yields a stable product without compromising the quality of taste or texture. That is, the advantages over other filler materials traditionally used in the art, is that it combines the excellent chew properties with stability and flavor release characteristics which no previous mineral filler was in itself capable of providing in food containing acidulents.

Gum bases using dicalcium phosphate anhydrate can be incorporated into sugar or sugarless chewing gum compositions, which can be made into a variety of products, e.g. stick or bubble gum products. The dicalcium phosphate anhydrate can be mixed with the gum base when the base is made, or alternatively added to the gum base just prior to incorporation of the base into the chewing gum composition. Bases containing the filler of this invention can be formulated into regular or non-adhering type formulations of chewing gums as well, without detracting from their properties. In essence, the dicalcium phosphate filled gum bases of the instant invention can be used with any compatible chewing gum composition, but it is most effective and demonstrates its fullest advantages when incorporated into acidic chewing gum compositions, e.g. citrus flavored chewing gums.

The amount of gum base employed will vary greatly depending on various factors such as the type of base used, consistency desired and other components used to make the final product. In general, amounts of about 5% to about 45% by weight of the final chewing gum composition are acceptable for use in chewing gum compositions with preferred amounts of about 15% to about 25% by weight. The gum base used in this invention may be any water-insoluble gum base well known in the art. Illustrative examples of suitable polymers in gum bases include both natural and synthetic elastomers and rubbers. For example, those polymers which are suitable in gum bases, include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin, and partially hydrogenated methyl ester of rosin and mixtures thereof. The solvent may be employed in an amount ranging from about 10% to about 75% and preferably about 45% to about 70% by weight of the gum base.

A variety of traditional ingredients used as plasticizers or softeners such as lanolin, stearic acid, sodium stearate, potassium stearate, glyceryl triacetate, glycerine and the like, may also be incorporated into the gum base to obtain a variety of desirable textures and consistency properties. These additional materials are generally employed in amounts of up to about 30% by weight and preferably in amounts of from about 3% to about 7% by weight of the final gum base composition.

The chewing gum compositions employing the instant gum bases generally contain sweetening agents. The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides, and polysaccharides such as xylose, ribose, glucose, mannose, galactose, fructose, dextrose, sucrose, sugar, maltose, partially hydrolyzed starch or corn syrup solids and sugar alcohols such as sorbitol, xylitol, mannitol and mixtures thereof.

B. Water-soluble artificial sweeteners such as the soluble saccharine salts, i.e., sodium or calcium saccharin salts, cyclamate salts, acesulfame-K and the like, and the free acid form of saccharin.

C. Dipeptide based sweeteners such as L-aspartyl-L-phenylalanine methyl ester and material described in U.S. Pat. No. 3,492,131 and the like.

In general, the amount of sweetener will vary with the desired amount of sweetners selected for a particular chewing gum composition. This amount will normally be 0.01% to about 90% by weight when using an easily extractable sweetener. As previously mentioned, the dicalcium phosphate anhydrous filler used in the gum base in amounts within the scope of this invention, help to effectively release the sweetening agents over time. This is an additional benefit to the film forming improvement of his invention. The water-soluble sweeteners described in category A above, are preferably used in amounts of about 25% to about 75% by weight, and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

The chewing gum composition of this invention may additionally include the conventional additives of coloring agents such as titanium dioxide; emulsifiers such as lecithin and glyceryl monostearate; and additional fillers such as aluminum hydroxide, alumina, aluminum silicates, and talc and combinations thereof. These additional fillers may also be used in the gum base in various amounts along with the dicalcium phosphate anhydrous, provided the total amount of fillers present remains between about 4% and 30% by weight. Preferably the amount of additional fillers when used will vary from about 25% to about 75% of the total fillers present in the gum base. By doing so, the chew characteristics and texture are varied as desired without destroying the advantages of the dicalcium phosphate anhydrous. The improvement in film forming capability and stability in the presence of food acidulents is directly related to the amount of dicalcium phosphate anhydrous filler present in the gum base.

Flavoring agents well known to the chewing gum art may be added to the chewing gum compositions of the instant invention. These flavoring agents may be chosen from synthetic flavor oils and/or oils derived from plants, leaves, flowers, fruits and so forth, and combinations thereof. Representative flavor oils include: spearmint oil, cinnamon oil, oil of wintergreen (methylsalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed is normally a matter of preference subject to such factors as flavor type, base type and strength desired. In general, amounts of about 0.05% to about 3.0% by weight of the final chewing gum composition are useable with amounts of about 0.3% to about 1.5% being preferred and about 0.7% to about 1.2% being most preferred.

The benefits of the instant invention are most clearly demonstrated when the chewing gum composition is a tart gum, i.e. a food containing chewing gum such as one containing a citrus flavor.

The following examples serve to provide further appreciation of the invention but are not meant in any way to restrict the effective scope of the invention. All percentages throughout the specification are by weight % of the final composition unless otherwise indicated.

EXAMPLE I

Gum bases were prepared using the formulations given below. As indicated, formulations A and B are typical of those prior art gum bases containing talc as a filler. Formulations C&D have only dicalcium phosphate anhydrate as a gum base filler. A mixture of talc and dicalcium phosphate anhydrous was used in gum bases E, F, and G.

As previously discussed dicalcium phosphate anhydrous is preferred over the dihydrate form due to its process advantages and advantageous chew, texture and flavor release properties. Combination of talc and dicalcium phosphate anhydrous have been found to be particularly useful in that chew, texture, flavor release and film forming properties can still be maintained while having the added advantage of cost saving due to the less expensive talc filler. All values in Table I are in % by weight of the gum base.

TABLE I

| Ingredient | GUM BASE FORMULATIONS (% by wt) | | | | | | |
|---|---|---|---|---|---|---|---|
| | A | B | C | D | E | F | G |
| Styrene Butadiene elastomer | 10.29 | 11.79 | 11.2 | 11.2 | 11.2 | 10.3 | 11.8 |
| Glycerol Ester of partially hydrogenated wood rosin | 33.72 | 36.51 | 29.50 | 34.68 | 34.7 | 33.7 | 36.5 |
| Hydrogenated oil | 4.90 | 5.62 | 5.3 | 5.3 | 5.4 | 4.9 | 5.6 |
| Glycerol Ester of Polymerized wood rosin | 23.39 | 23.39 | 27.5 | 22.2 | 22.2 | 23.4 | 23.4 |
| Lecithin | 1.17 | 1.17 | 1.10 | 1.11 | 1.2 | 1.2 | 1.2 |
| Glycerol Monostearate | 5.66 | 5.66 | 5.30 | 5.41 | 5.40 | 5.653 | 5.66 |
| Butylated Hydroxyanisole | 0.08 | 0.070 | 0.10 | 0.100 | 0.099 | 0.047 | 0.040 |
| Talc | 20.79 | 15.79 | — | — | 6.90 | 12.70 | 10.20 |
| Dicalcium Phosphate Anhydrous | — | — | 20 | 20 | 12.90 | 8.1 | 5.6 |

The gum bases above were used in formulating chewing gum composition for the purpose of evaluating the chew properties, film forming ability and flavor release capability of the resultant chewing gums. All ingredients for each of the chewing gum compositions were identical except for the gum base. The formulation given below, in % by weight of the total chewing gum composition was formulated in a manner well known in the chewing gum art, substituting each of the gum bases in Table I to make a total of seven chewing gum compositions.

TABLE II

| Ingredient | % by weight of chewing gum composition |
|---|---|
| gum base | 16.9 |
| high DE corn syrup | 24.9 |
| caramel paste | 1.9 |
| pulverized sugar | 53.7 |
| malic acid | 1.0 |
| flavor | 0.8 |
| wesson oil | 0.1 |
| coloring | 0.1 |
| glycerin | 0.3 |
| water potable | 0.3 |

Expert chew panels were conducted on the chewing gum compositions having the above formula. The members of the panel were asked to chew each chewing gum piece for approximately (5) to seven (7) minutes. The panelists were told to evaluate the compositions for chew characteristics, film forming ability, e.g. quality and ease of bubble blown, and flavor release. Each of the gum bases in Table I were used in the formulation of Table II to make a total of seven chewing gum compositions. These compositions were rated on a scale of 0–10, wherein 0 is the worst and 10 is the best. The results, which are shown below, represent an average number of all the panel ratings. The results indicate that those formulations containing the talc fillers (A & B) of the prior art, received substantially low ratings on both chew and bubble characteristics. Those compositions containing dicalcium phosphate anhydrous alone (C & D) or in admixture with talc (E & F) received significantly higher ratings than those compositions which do not contain them. Their chew rating ranged from 6.57 to 7.14 and the bubble rating ranged from 6.57 to 7.00, which is in contrast to the prior art composition (A & B) ranges of 3.00 to 3.63 and 4.86 to 5.88 for chew and bubble respectively. As indicated, flavor release was acceptable in all compositions, except composition E which was excellent.

TABLE III

| Gum Base | Chew | Bubble | Flavor Release |
|---|---|---|---|
| A (prior art) | 3.63 | 5.88 | acceptable |
| B (prior art) | 3.00 | 4.86 | acceptable |
| C | 7.10 | 6.57 | acceptable |
| D | 6.57 | 7.00 | acceptable |
| E | 7.57 | 6.86 | excellent |
| F | 7.14 | 6.80 | acceptable |
| G | 5.57 | 6.14 | acceptable |

EXAMPLE II

Three different chewing gum compositions were formulated using gum base E, as shown below, for the purpose of determining flavor release, impact and tartness perception, as a function of gum base filler in combination with accidulent level. As previously mentioned, the gum base of the instant invention improved the perception of flavor release and impact of the three formulations given below, THREE is the preferred, having the best of the above-mentioned properties. The most preferred embodiment of the invention is exemplified by this formulation. Table IV valves are given in weight % of the final chewing gum composition.

TABLE IV

| Ingredient | Formulation | | |
|---|---|---|---|
| | ONE | TWO | THREE |
| Gum Base E | 17.0 | 17.0 | 17. |
| High DE Corn Syrup | 24.53 | 24.53 | 24.53 |
| Caramel Paste | 2.0 | 2.0 | 2.0 |
| Pulverized Sugar | 54.45 | 54.20 | 53.94 |
| Malic Acid | .49 | .74 | 1.0 |
| Citrus flavor | .79 | .79 | 0.79 |
| Wesson oil | .09 | 0.9 | 0.9 |
| Color | .05 | 0.05 | 0.05 |
| Glycerin | 0.3 | 0.3 | 0.3 |
| Water Potable | 0.3 | 0.3 | 0.3 |

As demonstrated by the above examples, chewing gum compositions containing gum bases which comprise as a filler dicalcium phosphate anhydrate, either alone, or in combination with a small amount of another filler, e.g. alumina hydroxide, alumina, aluminum silicates, or dicalcium phosphate dihydrate, exhibit the improved properties described and explained herein.

The invention being thus described, it will be obvious that the same may be varied in many ways. Such variations are not to be regarded as a departure from the spirit and scope of the invention and all such modifications are intended to be included within the scope of the claims.

We claim:

1. In a bubble gum composition which comprises gum base, flavor, filler and sweetener, the improvement which comprises having incorporated into the gum base a filler which aids in producing an improved bubble and chew characteristics, thereby allowing for better flavor release, said filler comprising about 4% to about 30% by weight of the gum base dicalcium phosphate anhydrous.

2. A gum base for a bubble gum composition having film forming and bubble forming capability, flavor release and chew characteristics, comprising a natural or synthetic rubber and a dicalcium phosphate anhydrous filler present in amounts of about 4% to about 30% by weight of the gum base.

3. The composition of claim 2 wherein the natural rubber is selected from the group consisting of chicle, jelutong, balata, gutta-percha, lechi caspi, sorva and mixtures thereof.

4. The composition of claim 2 wherein the synthetic rubber is selected from the group consisting of butadiene-styrene copolymers, polyisobutylene, isobutylene-isprene copolymers and mixtures thereof.

5. The composition of claim 1 wherein the the flavor is selected from the group consisting of spearmint oil, cinnamon oil, oil of wintergreen (methyl-salicylate), lemon oil, orange oil, grape oil, lime oil, grapefruit oil, apple essence, strawberry essence, cherry essence, pineapple essence and a citrus combination.

6. The composition of claim 1 wherein the sweetening agent is selected from the group consisting of water-soluble sweetening agents, water-soluble artificial sweeteners, dipeptide based sweeteners and mixtures thereof.

7. The composition of claim 1 additional containing a material selected from the group consisting of coloring agents, emulsifiers, fillers, plasticizers, and mixtures thereof.

8. The composition of claim 2 which additionally contains a second filler selected from the group consisting of aluminum hydroxide, alumina, aluminum silicates, talc and mixtures thereof.

9. The composition of claim 2 wherein the gum base contains a mixture of fillers selected from dicalcium phosphate anhydrous and talc in an amount of about 4% to about 30% by weight of the gum base wherein the talc is present in an amount of about 25% to about 75% of the total fillers present.

10. The composition of claim 1 wherein the gum base contains a second filler selected from the group consisting of aluminum hydroxide, alumina, aluminum silicates, talc and mixtures thereof, wherein the amount of secondary filler is from about 25% to about 75% of the total fillers present.

11. The composition of claim 10 wherein the second filler is talc.

12. A bubble gum composition, which comprises:
(a) from about 5% to about 45% by weight gum base, said gum base having incorporated therein a filler which aids in producing an improved bubble and chew characteristics, said filler comprising about 4% to about 30% by weight of the gum base of dicalcium phosphate anhydrous,
(b) from about 0.05% to about 3.0% by weight flavor,
(c) from about 0.01% to about 90% by weight sweetener, and
(d) the remaining ingredient selected from the group consisting of coloring agents, emulsifiers, fillers, plasticizers, elastomer solvent, and mixtures thereof.

* * * * *